US012280984B2

(12) United States Patent
Ruhnke

(10) Patent No.: US 12,280,984 B2
(45) Date of Patent: Apr. 22, 2025

(54) ELEVATOR SYSTEM

(71) Applicant: Otis Elevator Company, Farmington, CT (US)

(72) Inventor: Jan Ruhnke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1580 days.

(21) Appl. No.: 16/663,768

(22) Filed: Oct. 25, 2019

(65) Prior Publication Data

US 2020/0130985 A1 Apr. 30, 2020

(30) Foreign Application Priority Data

Oct. 26, 2018 (EP) .................................... 18202844

(51) Int. Cl.

| | |
|---|---|
| ***B66B 1/32*** | (2006.01) |
| ***B66B 1/34*** | (2006.01) |
| ***B66B 5/00*** | (2006.01) |
| ***B66B 5/22*** | (2006.01) |

(52) U.S. Cl.

CPC .............. *B66B 1/32* (2013.01); *B66B 1/3492* (2013.01); *B66B 5/0031* (2013.01); *B66B 5/22* (2013.01)

(58) Field of Classification Search

CPC ........... B66B 5/0031; B66B 5/02; B66B 5/18; B66B 1/3492; B66B 5/0018; B66B 1/32; B66B 5/00; B66B 5/16; B66B 5/22; B66B 1/36; B66B 5/028; B66B 11/0286

See application file for complete search history.

(56) References Cited

U.S. PATENT DOCUMENTS

| | | | | |
|---|---|---|---|---|
| 5,202,539 A | | 4/1993 | Lamb | |
| 5,230,406 A | * | 7/1993 | Poon | B66B 5/18 187/376 |
| 6,170,614 B1 | | 1/2001 | Herkel et al. | |
| 9,027,714 B2 | | 5/2015 | Husmann et al. | |
| 9,145,282 B2 | | 9/2015 | Schuatt et al. | |
| 9,708,157 B2 | | 7/2017 | Porta et al. | |
| 2007/0000736 A1 | * | 1/2007 | Shikai | B66B 5/02 187/393 |
| 2011/0308895 A1 | * | 12/2011 | Shen | B66B 5/18 187/359 |
| 2020/0130985 A1 | * | 4/2020 | Ruhnke | B66B 5/22 |

FOREIGN PATENT DOCUMENTS

| | | |
|---|---|---|
| CN | 102653371 A | 9/2012 |
| CN | 203402778 U | 1/2014 |
| CN | 103601055 A | 2/2014 |
| CN | 106516933 A | 3/2017 |

(Continued)

OTHER PUBLICATIONS

European Search Report for application EP 18202844.9, Apr. 16, 2019, 6 pages.

*Primary Examiner* — Jeffrey Donels
(74) *Attorney, Agent, or Firm* — CANTOR COLBURN LLP

(57) ABSTRACT

A method of detecting whether an elevator safety device (20) of an elevator system (2) mounted to a moving object (6, 21), such as an elevator car (6) or a counterweight (21), has entered a fully activated state in which at least one engagement member (26*a*, 26*b*) of the elevator safety device (20) engages with a guide member (14).

19 Claims, 2 Drawing Sheets

(56) References Cited

FOREIGN PATENT DOCUMENTS

| | | | | | |
|---|---|---|---|---|---|
| CN | 109019229 | A | * | 12/2018 | ........... B66B 5/0031 |
| CN | 109019239 | A | * | 12/2018 | ............... B66B 5/06 |
| CN | 109562910 | A | * | 4/2019 | ............... B66B 5/04 |
| EP | 0308474 | B1 | | 8/1992 | |
| EP | 1741659 | A1 | * | 1/2007 | ........... B66B 5/0031 |
| EP | 1813566 | A1 | | 8/2007 | |
| EP | 2794451 | B1 | | 10/2014 | |
| EP | 2760776 | B1 | | 6/2015 | |
| EP | 2651809 | B1 | | 10/2015 | |
| EP | 2651808 | B1 | | 3/2016 | |
| EP | 2920101 | B1 | | 1/2017 | |
| EP | 3231756 | A1 | | 10/2017 | |
| EP | 3083474 | B1 | | 1/2018 | |
| EP | 3342741 | A1 | | 7/2018 | |
| EP | 3636575 | A1 | * | 4/2020 | ............... B66B 5/06 |
| EP | 3643666 | A1 | * | 4/2020 | ............... B66B 1/32 |
| JP | 5015246 | B2 | * | 8/2012 | ............. B66B 13/22 |
| KR | 20060063809 | A | * | 6/2006 | |
| KR | 20060065654 | A | * | 6/2006 | |
| WO | WO-2010098747 | A1 | * | 9/2010 | ............... B66B 5/18 |
| WO | 2016096320 | A1 | | 6/2016 | |
| WO | 2017001531 | A1 | | 1/2017 | |
| WO | 2017087978 | A1 | | 5/2017 | |
| WO | 2017098299 | A1 | | 6/2017 | |
| WO | 2018060251 | A1 | | 4/2018 | |

* cited by examiner

ELEVATOR SYSTEM

FOREIGN PRIORITY

This application claims priority to European Patent Application No. 18202844.9, filed Oct. 26, 2018, and all the benefits accruing therefrom under 35 U.S.C. § 119, the contents of which in its entirety are herein incorporated by reference.

BACKGROUND

The invention relates to an elevator system comprising an elevator safety device and to a method of monitoring the operation of an elevator safety device.

An elevator system typically comprises at least one elevator car moving along a hoistway between a plurality of landings, and a driving member, which is configured for driving the elevator car. Optionally, the elevator system may include a counterweight moving concurrently and in opposite direction with respect to the elevator car. For safe operation, an elevator system usually further comprises at least one elevator safety device. The elevator safety device is configured for braking the movement of the elevator car in particular in an emergency situation, for example when the movement of the elevator car exceeds a predefined speed or acceleration.

There are safety devices which are switchable between a released state allowing free movement of the elevator car, a partially activated state ("pre-tripped state"), in which the safety device is activated but not yet engaged with a guide member for braking the elevator car, and a fully activated state ("tripped state"), in which the safety device is engaged with the guide member preventing any further movement of the elevator car. While the elevator system may resume normal operation after the elevator safety device has been (only) partially activated, a mechanic needs to visit and check the elevator system before resuming normal operation when the elevator safety device has been fully activated.

Therefore it is necessary to reliably distinguish between the partially activated state ("pre-tripped state") and the fully activated state ("tripped state") of the elevator safety device. It in particular is desirable to provide a system and a method for reliably distinguishing between the partially activated state and a fully activated state which may be implemented and maintained at low costs.

BRIEF DESCRIPTION

According to an exemplary embodiment of the invention, an elevator system comprises: at least one moving object configured for traveling along at least one guide member extending between a plurality of landings; a position sensor configured for determining the current position of the at least one moving object along the at least one guide member; at least one elevator safety device mounted to the at least one moving object and comprising; a safety controller; a memory; at least one engagement member movable between a released state, in which it does not contact the at least one guide member; and an engaged state, in which it engages with the at least one guide member; and at least one actuation member mechanically coupled with the at least one engagement member and movable between a non-actuated state, in which it does not contact the at least one guide member; and an actuated state in which it contacts the at least one guide member.

The safety controller is configured for: causing the at least one actuation member to move from the non-actuated state into the actuated state and storing within the memory a position of the at least one moving object detected by the position sensor at a point of time within a given time frame around the moment in which the at least one actuation member is caused to move from the non-actuated state into the actuated state as a starting position; detecting the position of the at least one moving object along the at least one guide member after the actuation member has moved from a non-actuated state into the actuated state, in the following, this position is referred to as the detected position; calculating the distance between the detected position and the starting position; and determining that the elevator safety device has entered a fully activated state, in which the at least one engagement member engages with the at least one guide member, when the calculated distance between the detected position and the starting position reaches or exceeds a predefined limit.

In other words, the safety controller is configured to determine that the elevator safety device has entered a fully activated state when the car has moved with the at least one actuation member being positioned in the actuated state over a distance which is larger than the predefined limit.

According to an exemplary embodiment of the invention, a method for detecting whether an elevator safety device mounted to a moving object, which is configured for moving along a hoistway of an elevator system, has entered a fully activated state in which at least one engagement member of the elevator safety device engages with a guide member extending along the hoistway, comprises: causing an actuation member to move from a non-actuated state, in which it does not contact the guide member, into an actuated state, in which it contacts the guide member; detecting and storing the position of the at least one moving object along the guide member at a point of time within a given time frame around the moment in which the actuation member is caused to move from the non-actuated state into the actuated state as a starting position; detecting the position of the at least one moving object along the guide member after the actuation member has moved from the non-actuated state into the actuated state; calculating the distance between said detected position and the starting position; and determining that the elevator safety device has entered a fully activated state when the calculated distance between the detected position and the starting position reaches or exceeds a predefined limit.

The given time frame may include points of time before and after the moment at which the actuation member is caused to move. The given time frame in particular may start at the moment in which the actuation member is caused to move. The given time frame may have a length of up to 100 ms, in particular a length of 25 ms. More particularly, the given time frame may have a length between 5 ms and 10 ms.

The at least one moving object may include an elevator car and/or a counterweight configured for moving concurrently and in opposite direction with respect to the elevator car.

Exemplary embodiments of the invention allow reliably distinguishing between a partially activated state ("pre-tripped state"), in which an actuation member but no engagement member contacts the at least one guide member of the elevator system, and a fully activated state ("tripped state"), in which at least one engagement member is in engagement with at least one guide member of the elevator system, without employing additional hardware. Exemplary embodiments of the invention in particular may be implemented by modifying only the software of an existing safety controller using the existing hardware, in particular an existing position sensor. Thus, exemplary embodiments of the invention may be implemented and maintained at low costs.

A number of optional features are set out in the following. These features may be realized in particular embodiments, alone or in combination with any of the other features.

In order to realize a reliable detection, the predefined limit may bet set to a value corresponding to a portion of the distance the at least one moving object is usually moving after the elevator safety device has been activated by actuating the actuation member. The predefined limit for example may be set to a value in the range of 10 mm to 30 mm, in particular to a value between 15 mm and 25 mm, more particularly to a value of 15 mm, 20 mm, or 25 mm.

The elevator safety device may comprise an electric coil configured for moving the at least one actuation member between the non-actuated state and the actuated state. Depending on the direction of an electric current flowing through the electric coil, the at least one actuation member is either pushed against or pulled from the guide member.

The elevator safety device may comprise a local energy storage device in order to allow moving the actuation member between the non-actuated state and the actuated state even in case of power failure, i.e. in case the supply of electrical power to the elevator system is interrupted.

The position sensor may be an absolute position sensor configured for detecting an absolute position of the at least one moving object along the at least one guide member. The position sensor in particular may be configured for interacting with at least one coded tape extending parallel to the at least one guide member. The at least one coded tape may be coded optically, mechanically and/or magnetically.

Alternatively or additionally, the position sensor may include a relative position sensor configured for detecting a change of position of the at least one moving object, and a calculation unit configured for calculating the current position of the at least one moving object from a previously known position of the at least one moving object and the detected change of position of the at least one moving object. The position sensor in particular may include a velocity sensor configured for detecting the speed and the direction of the movement of the moving object and/or an acceleration sensor configured for detecting the acceleration of the at least one moving object.

The memory may be integrated with the safety controller. Alternatively, the memory may be provided separately from the safety controller.

The elevator safety device may include at least two engagement members configured for engaging with the at least one guide member. Providing at least two engagement members enhances the safety of the elevator system due to redundancy. It further reduces the load acting on each of the engagement members.

The at least two engagement members may be configured for moving simultaneously in order to symmetrically engage with the at least one guide member. The two engagement members in particular may be provided on opposing sides of the at least one guide member with the at least one guide member sandwiched in between, and the two engagement members the may be formed mirror-symmetrically with respect to the at least one guide member.

The at least two engagement members may be mechanically coupled with a common actuation member. Alternatively, each engagement member may be mechanically connected with an individual actuation member. In the latter case, the elevator safety device may be configured for actuating the at least two actuation members simultaneously for causing a simultaneous and symmetric movement of the at least two engagement members.

DRAWING DESCRIPTION

In the following, exemplary embodiments of the invention are described in more detail with respect to the enclosed figures:

FIG. 1 schematically depicts an elevator system comprising a safety device according to an exemplary embodiment of the invention.

DETAILED DESCRIPTION

Figure 1:
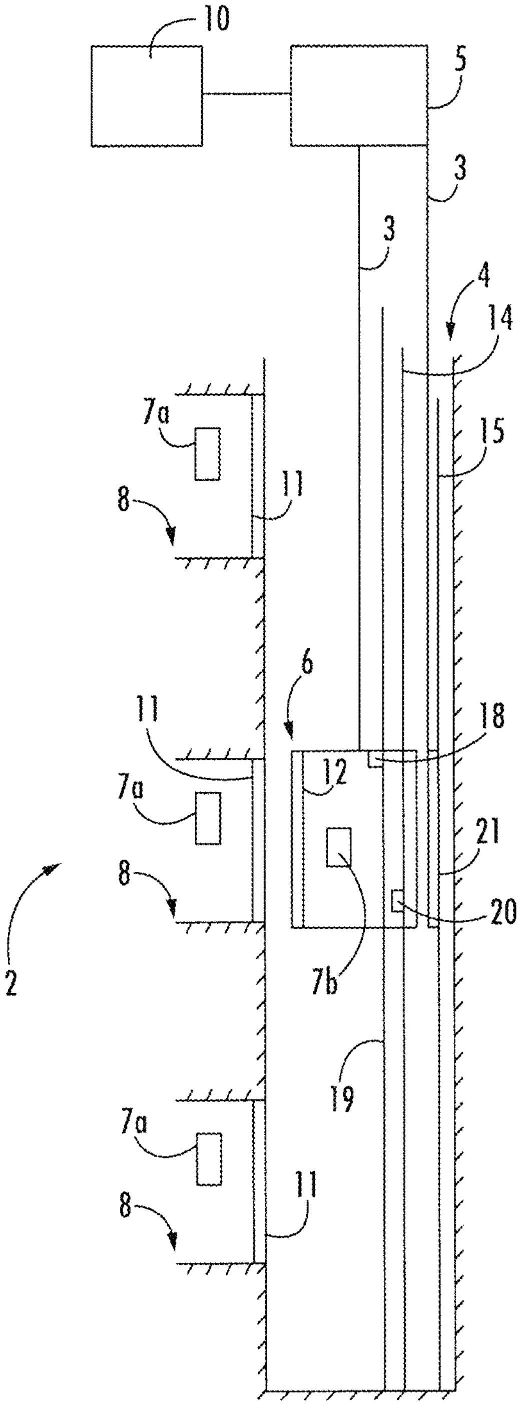

FIG. 1 schematically depicts an elevator system 2 comprising a safety device 20 according to an exemplary embodiment of the invention.

The elevator system 2 includes an elevator car 6 movably arranged within a hoistway 4 extending between a plurality of landings 8. The elevator car 6 in particular is movable along a plurality of car guide members 14, such as guide rails, extending along the vertical direction of the hoistway 4. Only one of said car guide members 14 is depicted in FIG. 1.

Although only one elevator car 6 is depicted in FIG. 1, the skilled person will understand that exemplary embodiments of the invention may include elevator systems 2 having a plurality of elevator cars 6 moving in one or more hoistways 4.

The elevator car 6 is movably suspended by means of a tension member 3. The tension member 3, for example a rope or belt, is connected to a drive unit 5, which is configured for driving the tension member 3 in order to move the elevator car 6 along the height of the hoistway 4 between the plurality of landings 8, which are located on different floors.

Each landing 8 is provided with a landing door 11, and the elevator car 6 is provided with a corresponding elevator car door 12 for allowing passengers to transfer between a landing 8 and the interior of the elevator car 6 when the elevator car 6 is positioned at the respective landing 8.

The exemplary embodiment shown in FIG. 1 uses a 1:1 roping for suspending the elevator car 6. The skilled person, however, easily understands that the type of the roping is not essential for the invention and different kinds of roping, e.g. a 2:1 roping or a 4:1 roping may be used as well.

The elevator system 2 includes further a counterweight 21 attached to the tension member 3 opposite to the elevator car 6 and moving concurrently and in opposite direction with respect to the elevator car 6 along at least one counterweight guide member 15. The skilled person will understand that the invention may be applied to elevator systems 2 which do not comprise a counterweight 21 as well.

The tension member 3 may be a rope, e.g. a steel core, or a belt. The tension member 3 may be uncoated or may have a coating, e.g. in the form of a polymer jacket. In a particular embodiment, the tension member 3 may be a belt comprising a plurality of polymer coated steel cords (not shown). The elevator system 2 may have a traction drive including a traction sheave for driving the tension member 3.

In an alternative configuration, which is not shown in the figures, the elevator system 2 may be an elevator system 2 without a tension member 3, comprising e.g. a hydraulic drive or a linear drive. The elevator system 2 may have a machine room (not shown) or it may be a machine room-less elevator system.

The drive unit 5 is controlled by an elevator control 10 for moving the elevator car 6 along the hoistway 4 between the different landings 8.

Input to the elevator control 10 may be provided via landing control panels 7*a*, which are provided on each landing 8 close to the landing doors 11, and/or via an elevator car control panel 7*b*, which is provided inside the elevator car 6.

The landing control panels 7*a* and the elevator car control panel 7*b* may be connected to the elevator control 10 by means of electrical wires, which are not depicted in FIG. 1, in particular by an electric bus, or by means of wireless data connections.

The elevator car 6 is equipped with a position sensor 18, which is configured for determining the current position of the elevator car 6 along the guide member 14.

The position sensor 18 in particular may be configured for determining the current position of the elevator car 6 with high accuracy, in particular with an accuracy of less than 1 cm or even less than 1 mm, e g with an accuracy of 0.5 mm.

The position sensor 18 may be an absolute position sensor 18 configured for detecting an absolute position of the elevator car 6 along the guide member 14. The position sensor 18 in particular may be configured for interacting with at least one coded tape 19 extending parallel to the guide member 14 for determining the current position of the elevator car 6. The at least one coded tape 19 may be coded optically, mechanically and/or magnetically.

Alternatively or additionally, the position sensor 18 may be a relative position sensor 18 which is configured for detecting changes of position of the elevator car 6 along the guide member 14 and calculating the current position of the elevator car 6 from a known previous position of the elevator car 6 and the detected changes of position of the elevator car 6.

A relative position sensor 18 may include a velocity sensor configured for detecting velocity, i.e. the speed and the moving direction, of the elevator car 6 and/or an acceleration sensor, which allows determining the velocity of the elevator car 6 from measured accelerations of the elevator car 6.

The elevator car 6 is further equipped with at least one elevator safety device 20. Alternatively or additionally, the counterweight 21 may be equipped with at least one elevator safety device 20, which, however, is not shown in FIG. 1.

The elevator safety device 20 is operable for braking or at least assisting in braking, i.e. decelerating and/or stopping, the elevator car 6 relative to a car guide member 14.

Figure 4:
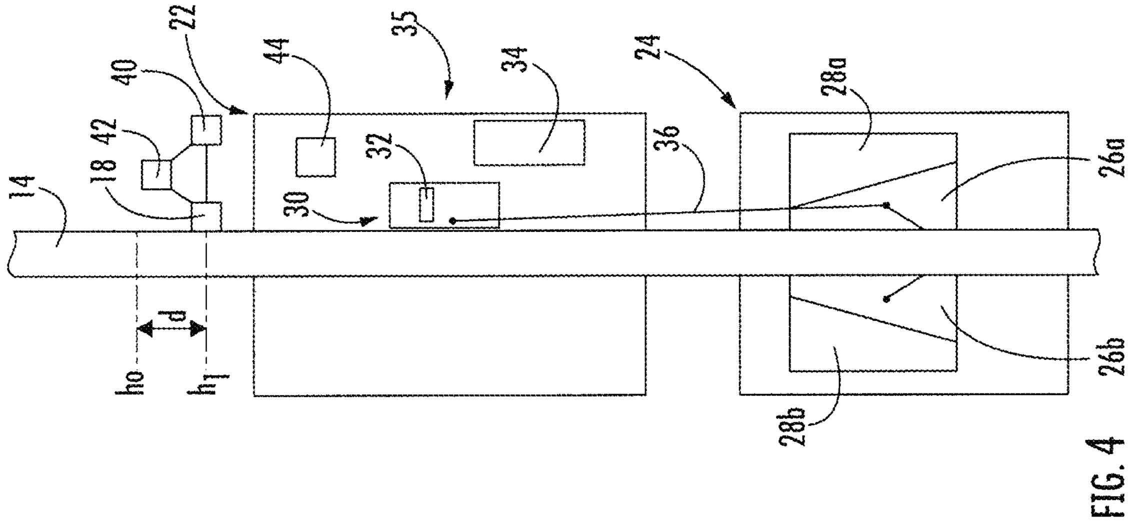
FIG. 4 depicts the elevator safety device in a fully activated state.
Figure 3:
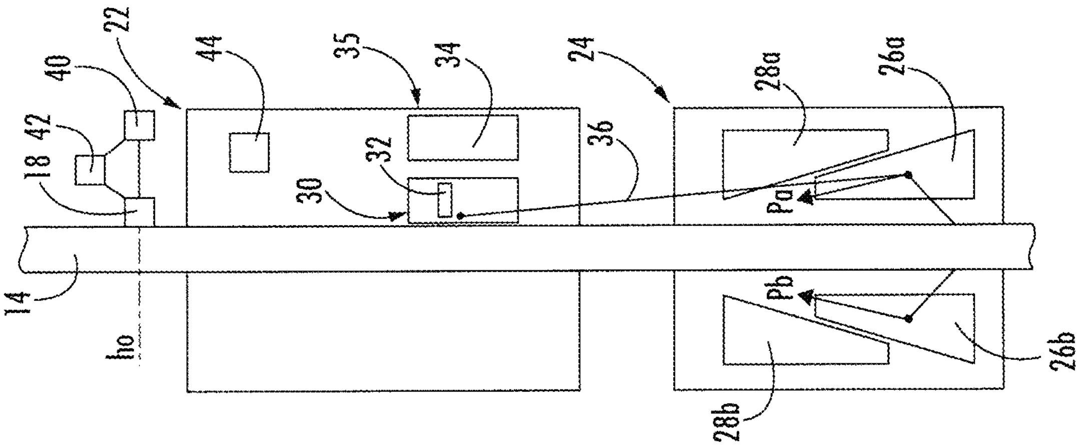
FIG. 3 depicts the elevator safety device in a partially activated state.
Figure 2:
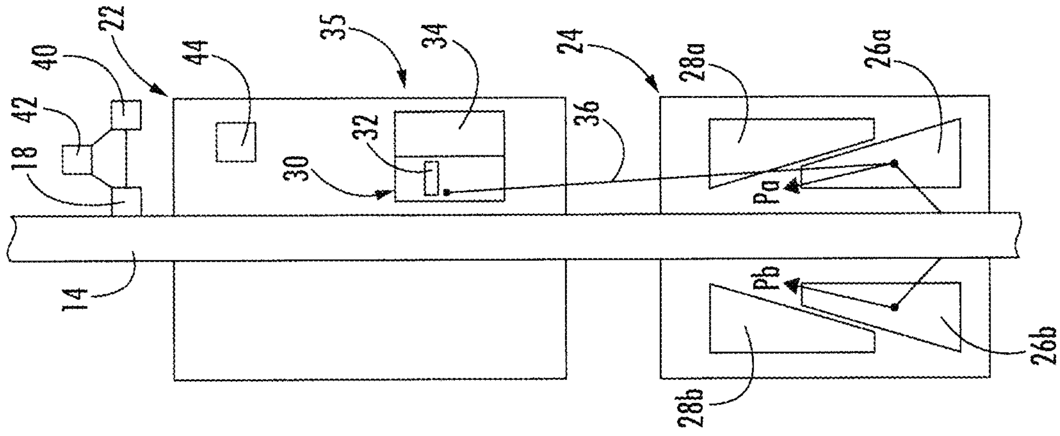
FIG. 2 depicts an elevator safety device according to an exemplary embodiment of the invention in a released (non-activated) state.

FIGS. 2 to 4 depict schematic views of an elevator safety device 20 according to an exemplary embodiment of the invention.

FIG. 2 depicts the elevator safety device 20 in a released (non-activated) state.

FIG. 3 depicts the elevator safety device 20 in a partially activated (pre-tripped) state.

FIG. 4 depicts the elevator safety device 20 in a fully activated (tripped) state.

The elevator safety device 20 comprises an actuation device 22 and an engagement device 24.

The actuation device 22 and the engagement device 24 are arranged next to each other along a longitudinal direction of the guide member 14 with the guide member 14 passing through both devices 22, 24.

The engagement device 24 comprises two engagement members 26*a*, 26*b* arranged on opposing sides of the guide member 14 so that the guide member 14 is sandwiched between the two engagement members 26*a*, 26*b*.

Each engagement member 26*a*, 26*b* is movable along a virtual path Pa, Pb which is inclined at an acute angle, in particular at an angle of less than 45° with respect to the guide member 14. Each engagement member 26*a*, 26*b* is movable between a released position, in which the engagement members 26*a*, 26*b* do not contact the guide members 14, as depicted in FIGS. 2 and 3, and an engaged position, in which the engagement members 26*a*, 26*b* are in engagement with the guide member 14, as depicted in FIG. 4.

Each of the engagement members 26*a*, 26*b* is wedge-shaped comprising an inner surface facing towards and extending parallel to the guide member 14, and an inclined outer surface facing away from the guide member 14.

The outer surfaces of the engagement members 26*a*, 26*b* are in contact with correspondingly oriented inner surfaces of wedge-shaped support members 28*a*, 28*b*, which are arranged on both sides of the guide member 14.

The support members 28*a*, 28*b* may be configured so that at least their inner surfaces facing the outer surfaces of the engagement members 26*a*, 26*b* are elastic or supported elastically in order to elastically urge the engagement members 26*a*, 26*b* against the guide member 14 when the engagement members 26*a*, 26*b* are arranged in the engaged position depicted in FIG. 4.

When arranged in the engaged position, movement of the elevator car 6 wedges the engagement members 26*a*, 26*b* between the guide member 14 and the support members 28*a*, 28*b*. The resulting wedging forces brake the elevator car 6 and, once braked, prevent any further downward movement of the elevator car 5 with respect to the guide member 14.

In the embodiment depicted in FIGS. 2 to 4, the actuation device 22 is arranged above the engagement device 24. In an alternative configuration, not shown in the figures, the actuation device 22 may be arranged below the engagement device 24. The actuation device 22 may also interact with engagement devices having a different configuration than the engagement device 22 exemplarily depicted in FIGS. 2 to 4.

The actuation device 22 comprises at least one actuation member 30, which is movable between a non-actuated state (see FIG. 2), in which it does not contact the guide member 14, and an actuated state (see FIGS. 3 and 4), in which the actuation member 30 contacts the guide member 14.

The actuation member 30 in particular includes or is a permanent magnet 32 generating an attractive force pulling the actuation member 30 against the guide member 14, which usually is made of metal.

The actuation device 22 comprises an electric coil 34, which is configured for moving the actuation member 30 between the non-actuated state, in which the actuation member 30 does not contact the guide member 14 (see FIG. 2), and the actuated state, in which the actuation member 30 contacts the guide member 14 (see FIGS. 3 and 4).

Depending on the direction of the electric current flowing through the electric coil 34, the permanent magnet 32 of the least one actuation member 30 is either pushed towards or pulled from the guide member 14 by the electromagnetic field generated by the electric current flowing through the electric coil 34.

The elevator safety device 20 may comprise a local energy storage device 44 providing electric energy for moving the actuation member 30 even in case the supply of electrical power to the elevator system 2 is interrupted.

The actuation member 30 is mechanically connected with the engagement members 26*a*, 26*b* of the engagement device 24 by means of at least one rod 36 extending basically parallel to the guide member 14 between the actuation device 22 and the engagement device 24.

Although only a single actuation mechanism 35 comprising a single actuation member 30 and a single electric coil 34 is shown in FIGS. 2 to 4, the skilled person understands that instead of mechanically connecting the two engagement members 26*a*, 26*b* with a single actuation mechanism 35, two actuation mechanisms 35 respectively interacting with each of the engagement members 26*a*, 26*b* may be employed as well.

During normal operation of the elevator system 2 the actuation member 30 is arranged in the non-actuated state as it is depicted in FIG. 2. In consequence, the engagement members 26*a*, 26*b* are arranged in their released states, and the elevator car 6 is able to move freely along the guide member 14.

For activating the elevator safety device 20, an electric current is caused to flow through the electric coil 34 generating an electromagnetic field urging the activation member 30 towards the guide member 14 into its actuated state in which is contacts the guide member 14, as depicted in FIG. 3. The activation member 30 is additionally pulled against the guide member 14 by the magnetic force between the permanent magnet 32 and the (metallic) guide member 14. The engagement members 26*a*, 26*b*, however, remain in their released states, respectively. This state is called the partially activated state or "pre-tripped" state.

In case the movement of the elevator car 6 has been stopped completely before the elevator safety device 20 is activated, the elevator safety device 20 stays in said partially activated state.

For resuming normal operation of the elevator system 2 and moving the elevator car 6 again, an electric current generating an electromagnetic force pulling the actuation member 30 back into its non-actuated state is flown through the electric coil 34.

In case, however, the elevator car 6 is still moving downwards when the elevator safety device 20 is activated, the actuation member 30 contacting and engaging with the guide member 14 is braked due to the engagement with the guide member 14, whereas the actuation device 22 and the engagement device 24 continue to move downwards together with the elevator car 6 along the guide member 6. In consequence, the actuation member 30 moves relatively to the actuation device 22 and to the engagement device 24.

As a result of said relative movement, the engagement members 26*a*, 26*b* are pulled by the actuation member 30 via the rod 36 from their released states depicted in FIGS. 2 and 3 into their engaged states depicted in FIG. 4. When arranged in the engaged states, the engagement members 26*a*, 26*b* engage with the guide member 14 braking the elevator car 6 and preventing any further movement of the elevator car 6.

This state is called the fully engaged state ("tripped state") of the elevator safety device 20.

Once the elevator safety device 20 has reached the fully engaged state, operation of the elevator system 2 usually may not resume automatically. Instead, a mechanic needs to visit the elevator system 2, release the elevator safety device 20 from the fully engaged state and identify the underlying problem which caused the engagement of the engagement members 26*a*, 26*b*.

Thus, it is desirable to reliably distinguish between the partially engaged state (FIG. 3) and the fully engaged state (FIG. 4) of the elevator safety device 20.

According to an exemplary embodiment of the invention, this distinction is achieved by detecting and monitoring the position (height) of the elevator car 6 along the guide member 14 after the safety device 20 has been activated.

As mentioned with respect to FIG. 1, the elevator car 6 is provided with at least one position sensor 18 configured for detecting the position (height) of the elevator car 6 along the guide member 14.

According to an exemplary embodiment of the invention, the current position (height) h0 of the elevator car 6 is determined by the position sensor 18 at the very moment in which the elevator safety device 20 is activated by interrupting the electric current flowing through the electric coil 24. Said position h0 is stored as a starting position in a memory 40.

Alternatively, the current position (height) h0 of the elevator car 6 may be determined within a given time frame including points of time before and/or after the moment in which the elevator safety device 20 is activated. The given time frame in particular may start at the moment in which the actuation member 30 is caused to move. The given time frame may have a length of up to 100 ms. The given time frame in particular may have a length in the range of 25 ms to 50 ms.

In the following, the position (height) h1 of the elevator car 6 is detected again and a safety controller 42 compares said newly detected position h1 (current position) with the previously stored position h0.

The current position h1 may be detected and compared with the previously stored position h0 a predetermined period of time after the safety device 20 has been activated. The current position also may be detected and compared repeatedly and/or continuously after the safety device 20 has been activated.

In case the distance d between the current position and the starting position (d=h0−h1) reaches or exceeds a predefined limit, the safety controller 42 determines that the elevator safety device 20 has entered the fully activated state (FIG. 4), in which the engagement members 26*a*, 26*b* engage with the guide member 14.

In case the distance d between the current position and the starting position (d=h0−h1) remains below the predefined limit, the safety controller 42 determines that the elevator safety device 20 is still in the partially activated state (FIG. 3), in which the engagement members 26*a*, 26*b* do not engage with the guide member 14.

In order to ensure a reliable detection of the fully activated state, the predefined limit is set to a value which is smaller than the distance the elevator car 6 moves from the partially activated state into the fully activated state.

For example, if the elevator car 6 moves approximately 35 mm from the partially activated state into the fully activated state, the predefined limit may be set to a value between 10 mm and 30 mm, in particular to a value of 10 mm to 20 mm, more particularly to a value of 15 mm Such a setting of the predefined limit allows reliably distinguishing between the partially activated state and the fully activated state of the elevator safety device 20.

Exemplary embodiments of the invention allow reliably distinguishing between the partially activated state and the fully activated state of an elevator safety device 20 without employing additional hardware. Exemplary embodiments of the invention in particular may be implemented by modifying only the software of an existing safety controller 42 using the existing hardware, in particular an existing position sensor 18. Exemplary embodiments of the invention therefore may be implemented and maintained at low costs.

Although an exemplary embodiment of the invention has been described for a safety device 20 mounted to an elevator car 6 and configured for braking a downward movement of the elevator car 6, the skilled person understands that exemplary embodiments of the invention may include safety devices 20 mounted to a counterweight 21, if present. Safety devices 20 according to exemplary embodiments of the invention further may be configured for braking upward movements of the elevator car 6. They in particular may be bi-directional safety devices 20, which are configured for braking a movement of the elevator car 6 in both directions, i.e. upwards and downwards.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES

2 elevator system
3 tension member
4 hoistway
5 drive unit
6 elevator car
7*a* landing control panel
7*b* elevator car control panel
8 landing
10 elevator control
11 landing door
12 elevator car door
14 car guide member
15 counterweight guide member
18 position sensor
19 coded tape
20 elevator safety device
21 counterweight
22 activation device
24 engagement device
26*a*, 26*b* engagement members
28*a*, 28*b* support members
30 actuation member
32 permanent magnet
34 electric coil
35 actuation mechanism
36 rod
40 memory
42 safety controller
44 local energy storage device
h0 first height/starting position
h1 second height/current position
d distance between the current position and the starting position

What is claimed is:

1. Elevator system (2) comprising at least one moving object (6, 21) configured for traveling along at least one guide member (14) extending between a plurality of landings (8);

a position sensor (18) configured for determining the current position of the moving object (6, 21) along the guide member (14);

at least one elevator safety device (20) mounted to the moving object (6, 21) comprising:

a safety controller (42);

a memory (40);

at least one engagement member (26*a*, 26*b*) movable between a non-actuated state in which the at least one engagement member (26*a*, 26*b*) does not contact the guide member (14); and an engaged state in which the at least one engagement member (26*a*, 26*b*) engages with the guide member (14); and at least one actuation member (30) mechanically coupled with the at least one engagement member (26*a*, 26*b*) and movable between a non-actuated state in which the at least one actuation member (30) does not contact the guide member (14); and a partially actuated state in which the at least one actuation member (30) contacts the guide member (14);

wherein the safety controller (42) is configured for:

causing the at least one actuation member (30) to move from the non-actuated state into the partially actuated state and storing within the memory (40) a position of the moving object (6, 21) detected by the position sensor (18) at a point of time within a given time frame around the moment in which the at least one actuation member (30) is caused to move from the non-actuated state into the partially actuated state as a starting position;

detecting as a detected position the position of the moving object (6, 21) along the guide member (14) after the actuation member (30) has been moved from a non-actuated state into the partially actuated state;

calculating the distance (d) between the detected position and the starting position; and determining that the elevator safety device (20) has entered a fully activated state configured to stop motion of the object (6, 21), in which the at least one engagement member (26*a*, 26*b*) engages with the guide member (14), when the calculated distance (d) between the detected position and the starting position reaches or exceeds a predefined limit.

2. Elevator system (2) according to claim 1, wherein the at least one moving object (6, 21) includes an elevator car (6) and/or a counterweight (21).

3. Elevator system (2) according to claim 1, wherein the predefined limit is set to a value in the range of 10 mm to 30 mm.

4. Elevator system (2) according to claim 1, wherein the given time frame starts at the moment in which the actuation member is caused to move.

5. Elevator system (2) according to claim 1, wherein the elevator safety device (20) comprises an electric coil (34)

configured for moving the at least one actuation member (30) between the non-actuated state and the partially actuated state.

6. Elevator system (2) according to claim 1, wherein the position sensor (18) is an absolute position sensor (18) configured for detecting an absolute position of the at least one moving object (6, 21) along the at least one guide member (14).

7. Elevator system (2) according to claim 6, wherein the position sensor (18) is configured for interacting with at least one coded tape (19) extending parallel to the at least one guide member (14).

8. Elevator system (2) according to claim 1, wherein the position sensor (18) includes a relative position sensor (18) configured for detecting a change of the position of the moving object (6, 21).

9. Elevator system (2) according to claim 1, wherein the elevator safety device (20) includes at least two engagement members (26*a*, 26*b*).

10. Elevator system (2) according to claim 9, wherein the at least two engagement members (26*a*, 26*b*) are configured for moving simultaneously, wherein at least two engagement members (26*a*, 26*b*).

11. Elevator system (2) according to claim 9, wherein the at least two engagement members (26*a*, 26*b*) are formed mirror-symmetrically with respect to the at least one guide member (14).

12. Elevator system (2) according to claim 1, wherein the memory (40) is formed integrally with the safety controller (42).

13. Elevator system (2) according to claim 3, wherein the predefined limit is set to a value in a range of between 15 mm and 25 mm.

14. Elevator system (2) according to claim 1, wherein the given time frame has a length of up to 100 ms.

15. Elevator system (2) according to claim 1, wherein the at least one actuation member (30) comprises a permanent magnet.

16. Method of detecting whether an elevator safety device (20) mounted to a moving object (6, 21), which is configured for moving along a hoistway (4) of an elevator system (2), has entered a fully activated state in which at least one engagement member (26*a*, 26*b*) of the elevator safety device (20) engages with a guide member (14) extending along the hoistway (4), the method comprising:

causing an actuation member (30) to move from a non-actuated state, in which it does not contact the guide member (14), into a partially actuated state, in which the actuation member contacts the guide member (14);

detecting and storing the position of the moving object (6, 21) along the guide member (14) at a point of time within a given time frame around the moment in which the actuation member (30) is caused to move from the non-actuated state into the partially actuated state as a starting position;

detecting as a detected position the position of the moving object (6, 21) along the guide member (14) after the actuation member (30) has been caused to move from the non-actuated state into the partially actuated state;

calculating the distance (d) between said detected position and the starting position; and determining that the elevator safety device (20) has entered the fully activated state when the calculated distance (d) between the detected position and the starting position reaches or exceeds a predefined limit.

17. Method according to claim 16, wherein the predefined limit is set to a value in the range of 10 mm to 30 mm.

18. Method according to claim 16, wherein moving the actuation member (30) from the non-actuated state into the partially actuated state includes interrupting an electric current flowing through an electric coil (34).

19. Method according to claim 17, wherein the predefined limit is set to a value in a range of between 15 mm and 25 mm.

* * * * *